March 7, 1967 W. J. GILMORE 3,307,421
CONTROL CABLE ASSEMBLY
Filed May 4, 1964 2 Sheets-Sheet 1
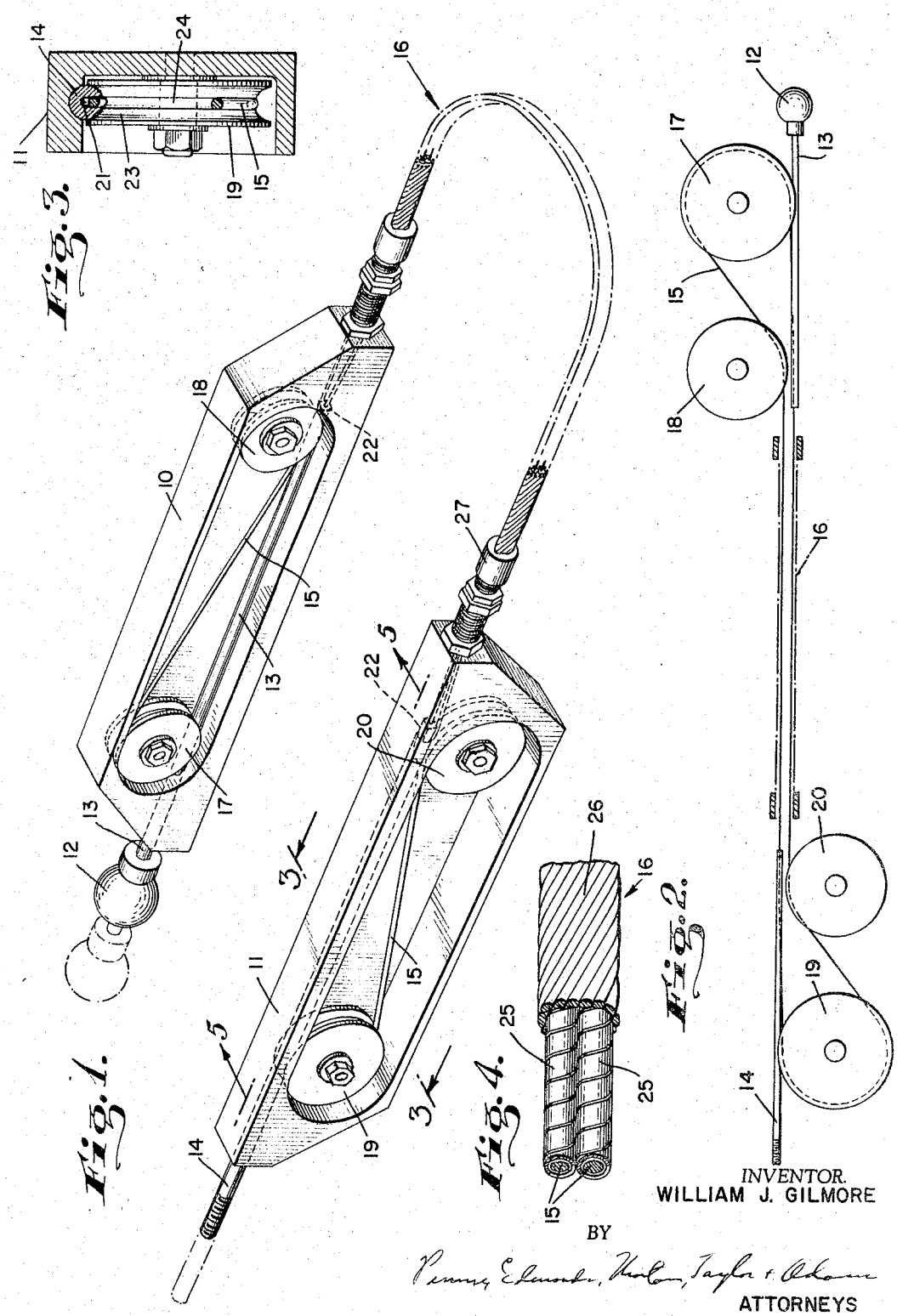
INVENTOR.
WILLIAM J. GILMORE
BY
ATTORNEYS March 7, 1967   W. J. GILMORE   3,307,421
CONTROL CABLE ASSEMBLY
Filed May 4, 1964   2 Sheets-Sheet 2
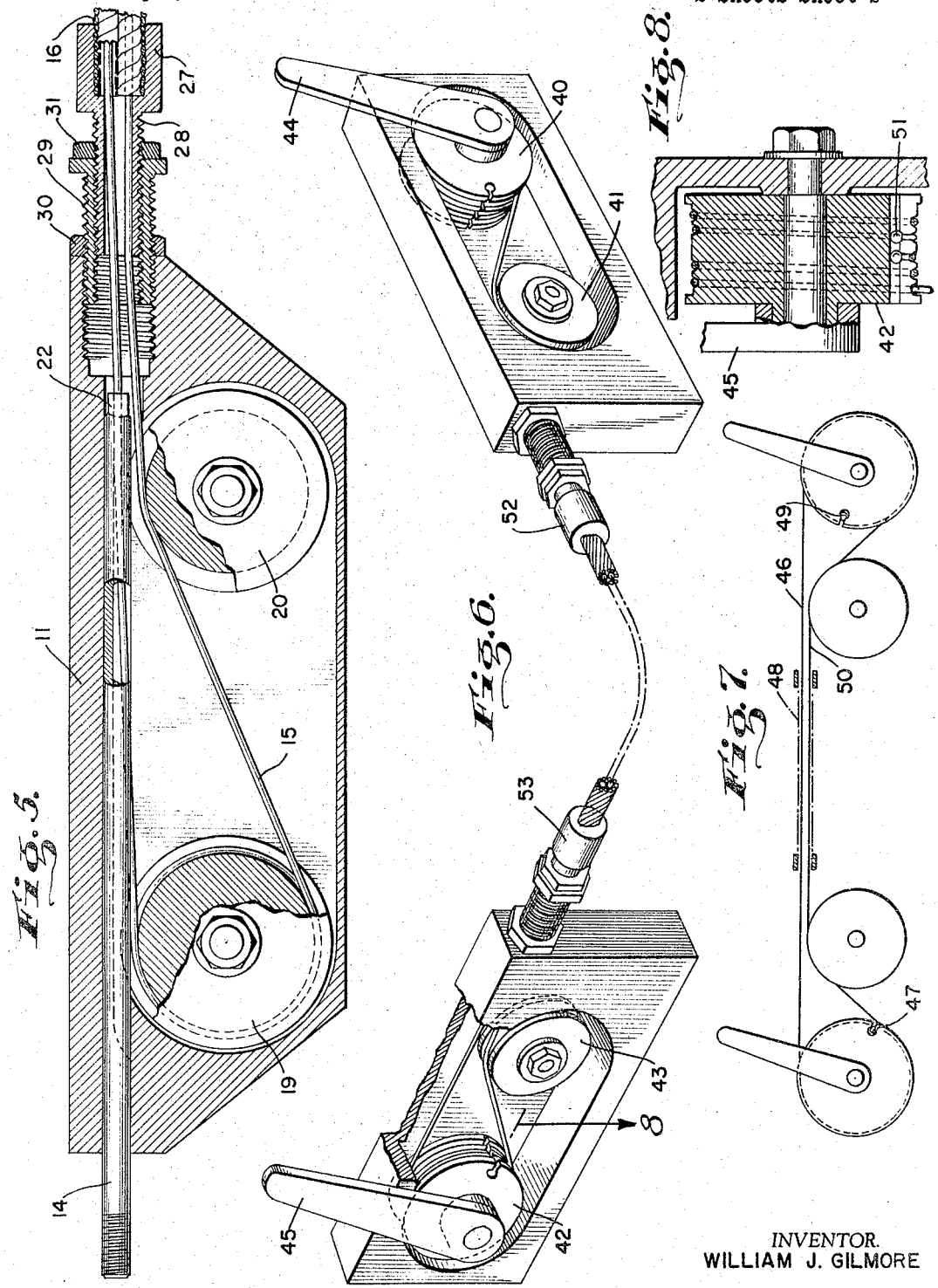
INVENTOR.
WILLIAM J. GILMORE
BY
ATTORNEYS

United States Patent Office 3,307,421
Patented Mar. 7, 1967

3,307,421
CONTROL CABLE ASSEMBLY
William J. Gilmore, Manitou Beach, Mich., assignor to American Chain & Cable Company, Inc., New York, N.Y., a corporation of New York
Filed May 4, 1964, Ser. No. 364,644
1 Claim. (Cl. 74—501)

This invention relates to flexible control cables adapted to transmit motion between spaced elements by means of a core element movable within a casing. More particularly, it relates to improved means for transmitting such displacement without lost motion due to backlash and other causes.

Control cable assemblies comprise a flexible tubular casing anchored at its ends and a flexible wire core element which may be moved axially within the casing by pushing or pulling at one end to exert a corresponding force on a device attached to the other end. Push-pull controls are now expected to transmit dozens or even hundreds of pounds and at the same time conform to certain specifications as to performance. The casing must be flexible and at the same time its bore should remain undistorted when bent on a reasonable radius. Also, the casing must be capable of resisting tensile or compressive forces tending to lengthen or shorten it. The core element should be as inextensible and incompressible as possible and must fit the bore of the casing closely. The core element should move within the bore of the casing without binding or excessive friction despite reasonable bends in the casing. One effective form of casing conforming to the above considerations is made of stranded steel wires with an internal liner of flat wire coiled with a slight spacing between its turns. Around the stranded wires there may be wrapped a layer of spaced steel wire for the purpose of preventing bird caging under compressive loads.

The above type of casing is utilized with a core member consisting essentially of stranded steel wires and, within its own limitations, it has proved very satisfactory. However, the demand for increasing loads and accurate correspondence of motion of the output end to the motion of the input end has reached a point beyond the capability of the conventional structure so far described. For instance, the clearance required between the outer surface of the core element and the inner bore of the casing results in a certain amount of backlash if the device is utilized in a bent condition. One way of eliminating this is by providing a spring at the output end of the core element assuring that it is always under tension regardless of its direction of motion. However, such an expedient increases the load to be overcome by the input mechanism. Another consideration is that the tubular casing does have a certain amount of stretch and compressibility which is essentially elastic and, under high imposed loads, the output end of the core element does not accurately follow the motion of the input end thereof.

In view of the above limitations, it is a primary purpose of the present invention to provide a control cable assembly in which high loads may be transmitted with a minimum of backlash and stretch or compression of either the inner or outer members thereof.

This is accomplished by a push-pull cable assembly free of lost motion comprising a casing and a double-run core element extending through and longitudinally movable within the casing. Terminal means at opposite ends of the casing are provided wherein the adjacent ends of the core element runs are linked so that movement in one direction of the runs in the casing is accompanied by movement in the other direction of the other of the runs in the casing. On the respective terminal means driving and driven elements are linked to the core element for transmission of motion between them. Adjustment means are included for effectively lengthening the casing and shortening the core element to eliminate lost motion during operation of the assembly.

Preferred embodiments of the invention are described hereinbelow with reference to the accompanying drawings, wherein FIG. 1 is a perspective view partly broken away of a form of the new push-pull cable assembly adapted to transmit linear motion;

FIG. 2 is a schematic illustration of the parts of the embodiment of FIG. 1;

FIG. 3 is a section taken along the line 3—3 of FIG. 1;

FIG. 4 is an enlarged fragmentary perspective partly broken away of a portion of the casing from the embodiment of FIG. 1;

FIG. 5 is a fragmentary section partly broken away taken along the line 5—5 of FIG. 1;

FIG. 6 is a perspective partly broken away of another embodiment of the new push-pull cable assembly adapted to transmit rotary motion;

FIG. 7 is a schematic illustration of the parts of the embodiment of FIG. 6; and FIG. 8 is an enlarged fragmentary section partly broken away taken along the line 8—8 of FIG. 6.

The principle upon which the present invention is based is the employment of a novel structure capable of pre-stressing the core element and the casing to a sufficient degree to insure that elastic stretch or compression of either member is minimized. At the same time, backlash is eliminated by placing the core element under continual tension without, however, requiring the use of springs or the like at the output end of the assembly. Other broad aspects of the devices will become apparent as the description proceeds.

The device shown in FIG. 1 includes two terminal boxes 10 and 11. A knob 12 mounted on a rod 13 is adapted to be pushed or pulled on the terminal box 10 to operate the device. From the terminal box 11 there protrudes a similar rod 14 which may be secured to any device which is to be operated by means of the knob 12. In the particular assembly shown, pushing the knob 12 towards the terminal box 10 causes the rod 14 to be drawn into the terminal box 11 and for transmission of this motion a closed-loop core element 15 is provided which has its two runs extending through a dual-bore casing 16. Within the terminal box 10 is a pair of sheaves 17 and 18 which are freely rotatable and disposed approximately tangential to a projection of the centerline of the adjacent portion of the casing 16. A similar pair of sheaves 19 and 20 are located within the other terminal box 11. Starting for reference at the top of the sheaves 17, the core element 15 extends under the sheave 18 through the casing 16, over the sheave 20, under and around the sheave 19, past a connection with the rod 14, back through the casing 16, past a connection with the rod 13, and under and around the sheave 17. This is most clear in FIGS. 1 and 2.

As shown in FIG. 3, each rod 13 and 14 is provided with a groove 21 of a sufficient width to receive the core element 15. Near its inner end each of the rods is swaged to retain the core element in the respective groove against longitudinal movement with respect to the rod. In practice, this swaging is done in dies which leave the end of each rod square as shown at 22. It will be appreciated that despite the swaging the core element is free to enter and leave the groove 21 in each rod except in the immediate region of swaging. The sheaves 17 and 19 are provided with a groove 23 for the reception and support of the rods 13 and 14 respectively and they also contain a groove 24 for receiving the core element 15 as best shown in FIG. 3. The sheaves 18 and 20 are similarly provided with grooves which receive the core element 15 although it is not necessary that the treads be shaped for reception of the rods which clear them as shown in FIGS. 1 and 2.

From what has been explained up to this point it will be seen that if the core element 15 is kept taut inward motion of the rod 13 will be accompanied by a corresponding inward motion of the rod 14. To keep the core element taut and at the same time permit its motion, the structure shown in FIGS. 1 and 5 is utilized to attach the casing 16 to each of the terminal boxes 10 and 11. This casing consists essentially of a pair of tubular members 25 formed by winding flat wire in such a fashion that the edges of the adjacent convolutions are slightly spaced from each other as shown in FIG. 4. Secured around the two tubular members to bind them together and form a support for them is a plurality of helically stranded wires 26 of circular or other cross section. These wires adjoin each other side-by-side and form the main strength element of the casing resisting its elongation and compression under load.

As was stated before, it is an object of the present invention to eliminate backlash and the effects of elastic yield of the core element and the casing and for this purpose it is necessary to pre-stress them. At the terminal box 11, the end of the casing 16 is secured in a fitting 27 which is most conveniently swaged around the exterior thereof in such a fashion that the metal of the fitting 27 enters into the interstices between the wires 26 and thus locks the entire casing closely to the fitting 27. The fitting 27 is provided with a shank 28 exteriorly threaded for insertion into the tapped bore of a bushing 29. The bushing 29 is in turn threaded on its exterior surface for engagement with a tapped bore in the terminal box 11. Nuts 30 and 31 complete the assembly. A similar arrangement may be employed at the terminal box 10.

The telescoping assembly of threaded elements and nuts so far described constitutes longitudinal adjustment means which may be utilized for the purpose of increasing or decreasing the effective length of the casing 16 as measured between the two terminal boxes. When the device shown in FIG. 1 is put together the threaded bushing 29 and the nuts 30 and 31 are manipulated until a sufficient tension is generated in the casing 16 to serve the purposes intended. As the bushing 29 is moved away from the terminal box 11 a compressive force is exerted on the casing 16. This can be carried to the point at which the casing 16 no longer shortens elastically when put under compressive loads engendered by pulling the knob 12. Of course, the internal core element 15 is stressed at the same time so that its tendency to stretch engendered by a pull on the knob 12 does not exceed its elastic yield point.

The structure consisting of the wires 26 laid with a long pitch around a central core will in general bend in a fashion such that its neutral axis coincides with the geometric axis of the structure. It has been found that because of the flat configuration of the entire assembly it has a tendency to bend in a plane perpendicular to its wider side and take the configuration shown in FIG. 1. It is a matter of choice whether or not pushing on the knob 12 will cause retraction of the rod 14 or whether the rod 14 will be extended. In order that a push on the knob 12 causes extension of the rod 14, the sheaves 17 and 18 should be on the same side of the casing 16 as sheaves 19 and 20, rather than on opposite sides as they are shown in FIGS. 1 to 5.

Such an arrangement is employed in the embodiment of FIGS. 6 to 8 with input sheaves 40 and 41 and output sheaves 42 and 43. Cranks 44 and 45 are attached to the sheaves 40 and 42 respectively so that rotary motion of one crank can be transmitted to the other. As shown most clearly in FIG. 7, a core element 46 is affixed to the sheave 42 by means of a ball fitting 47 attached within a slot. From that point, the core element 46 passes twice around the sheave 42 in an appropriate groove and then tangentially from its upper periphery through a dual-bore casing 48. At the other end of the casing the core element 46 is directed over and twice around the sheave 40 and is affixed thereto by another ball fitting 49 secured in an appropriate slot. A second core element 50 is also attached to the sheave 42 by a ball 51 (see FIG. 8) in a slot, and it passes twice around the sheave 42 and over the sheave 43 into the other bore of the casing 48. From the casing 48, the core element 50 passes over the sheave 41 and then under and twice around the sheave 40 for attachment by means of another ball within a slot not shown in the drawing. Adjustable anchorage fittings 52 and 53 identical to those described in previous embodiment are provided to obtain the optimum tension on the casing 48 and the core elements 46 and 50 during operation.

By this arrangement rotation of the input crank 44 causes rotation of the output crank 45 in the same direction, with no backlash due to elasticity or lost motion of the movable parts of the assembly. Though two separate core elements 46 and 50 are described, it will be apparent that they are in effect one core element of a closed-loop type since both are attached at their ends at corresponding points on the sheaves 40 and 42. Because the core elements are wrapped twice around these sheaves, the cranks may be displaced through almost two full turns in either direction. If one closed-loop core element were actually employed and the ball-and-socket attachments to the sheaves 40 and 42 were eliminated, the cranks could be rotated through an unlimited number of turns so long as there was sufficient friction between the core element and the input and output sheaves 40 and 42 to transmit positive forces. Of course, the output crank 45 can be made to rotate in a direction opposite that of the input crank 44 simply by reversing the sheave and core element arrangement in the manner described in reference to the embodiment of FIGS. 1 to 5. Also, a rod can replace either the input crank 44 or the output crank 45 to convert linear to rotary motion or vice versa.

I claim:

In a push-pull cable assembly including flexible casing means and a flexible double-run core element extending therethrough having adjacent ends of its runs linked so that longitudinal movement of one run in one direction in the casing means is accompanied by longitudinal movement of the other run in the opposite direction in the casing means, said assembly being improved in that said casing means comprises (a) an open-turn helical coil of flat wire forming a first tubular element about one run of said core element, (b) another open-turn helical coil of flat wire forming a second tubular element about the other run of said core element, and (c) a multiplicity of wires stranded side-by-side about said first and second tubular elements and forming a single sheath within which said tubular elements are bound together in parallel side-by-side relation, (d) said sheath having a substantially flat cross sectional configuration and being flexible in a plane perpendicular to the longer dimension of its cross section without substantial displacement of its neutral bending and geometric axes.

References Cited by the Examiner

UNITED STATES PATENTS

| | | | |
|---|---|---|---|
| 1,100,482 | 6/1914 | Herzmark | 74—501 |
| 1,924,404 | 8/1933 | Houdaille | 74—501 |
| 2,324,475 | 7/1943 | Arens. | |
| 2,706,494 | 4/1955 | Morse | 74—501 X |
| 2,737,822 | 3/1956 | Morse | 74—501 X |
| 3,101,821 | 8/1963 | Henry | 74—501 X |

FOREIGN PATENTS 1,253,681　　1/1961　　France.

FRED C. MATTERN, Jr., *Primary Examiner.*

C. F. GREEN, *Assistant Examiner.*